United States Patent [19]
Leitz et al.

[11] 3,960,410
[45] June 1, 1976

[54] SYSTEM FOR ACHIEVING A MAXIMUM BRAKING EFFECT

[75] Inventors: Ludwig Leitz; Knut Heitman, both of Wetzlar, Germany

[73] Assignee: Ernst Leitz G.m.b.H., Wetzlar, Germany

[22] Filed: Oct. 7, 1974

[21] Appl. No.: 512,706

[30] Foreign Application Priority Data
Oct. 31, 1973 Germany.......................... 2354491

[52] U.S. Cl............................. 303/21 A; 180/82 R; 180/98; 307/10 R; 324/161; 340/53; 340/62; 356/28
[51] Int. Cl.²............................................ B60T 8/02
[58] Field of Search............. 180/82 R, 98; 188/181; 250/211; 303/20, 21; 307/10 R; 324/161–162; 340/53, 62; 346/33; 356/4, 28, 169; 244/111; 105/61; 246/182 A–182 C; 290/17; 318/52

[56] References Cited
UNITED STATES PATENTS

| | | | |
|---|---|---|---|
| 2,927,302 | 3/1960 | Steigerwald | 244/111 X |
| 3,466,097 | 9/1969 | Flook, Jr. | 303/21 R |
| 3,578,819 | 5/1971 | Atkins | 188/181 A X |
| 3,653,727 | 4/1972 | Kullberg et al. | 188/181 R X |
| 3,667,813 | 6/1972 | Burckhardt et al. | 303/21 EB |
| 3,689,120 | 9/1972 | Sumiyoshi et al. | 303/21 A |
| 3,689,882 | 9/1972 | Dessailly | 340/53 |
| 3,734,573 | 5/1973 | Davis et al. | 303/20 X |
| 3,756,662 | 9/1973 | Kuwana | 303/21 P |
| 3,758,166 | 9/1973 | Kuwana et al. | 303/21 P |
| 3,856,401 | 12/1974 | Hekmann et al. | 356/28 |

*Primary Examiner*—Duane A. Reger
*Assistant Examiner*—Stephen G. Kunin
*Attorney, Agent, or Firm*—Gilbert L. Wells

[57] ABSTRACT

The maximum braking or powering effect due to changing road conditions, preferably for the case of full braking of a rubber-tired vehicle is determined in the system of the present invention during normal driving conditions. In this system measurement apparatus known per se are used wherein 1. acceleration or deceleration and/or powering or braking torques, and simultaneously
2. the positive or negative slippages occuring from at least one powered or braked running member are measured and compared with one another as a function of time over a predetermined period, and the characteristics obtained possibly following intermediate storage from this comparison are fed to a display system and/or, following comparison with other data relating to extant traffic conditions, are fed to a control or regulation system so as to act on the braking or powering system.

15 Claims, 3 Drawing Figures

SYSTEM FOR ACHIEVING A MAXIMUM BRAKING EFFECT

CROSS-REFERENCES TO RELATED APPLICATIONS

The disclosures of assignee's copending applications Ser. Nos. 283,967, now abandoned; 333,514, now U.S. Pat. No. 3,856,401; and 344,484, filed in the U.S. Patent Office on Aug. 28, 1972; Feb. 20, 1973; and Mar. 26, 1973 respectively, are incorporated herein. Application Ser. No. 344,484 discloses, among other things, a system for indicating information on the behavior of other road users and automatically interfering in the braking system. Application Ser. No. 283,967 and U.S. Pat. No. 3,856,401 disclose components used in the systems of application Ser. No. 344,484.

BACKGROUND OF THE INVENTION

The present invention relates to a system for achieving an approximately maximum theoretical braking efficiency, preferably when full braking action of a rubber tired street vehicle is involved, or maximum powering efficiency, as a function of varying properties of the road, during normal travel.

The state of the art of anti-locking systems and anti-crash detector systems may be ascertained by reference to U.S. Pat. Nos. 3,611,284 and 3,689,882, the disclosures of which are incorporated herein. The operation of no-contact distance measuring devices useful in the present invention may be ascertained by reference to U.S. Pat. No. 3,781,110, the disclosure of which is incorporated herein.

Systems for achieving maximum braking efficiency or optimum braking slippage are known. Such systems are based on the principle that an inert mass connected (via a transmission system to a wheel) may both move under the influence of translational deceleration and may rotate with respect to the wheel being braked under the influence of a rotational deceleration. Both motions so act upon a movable sleeve by means of coarse threads that the sleeve only shifts if there is a difference between the two decelerations. Shifting of the sleeve is employed in known manner by means of a servo system in order to affect the braking pressure. As regards this system, friction in the coarse threads may cause difficulties.

Other systems of this kind operate on the basis of sensing the rotational deceleration and comparison with the actual travel speeds.

Besides achieving the maximum braking and/or driving efficiency possible under the circumstances, the problem of this present invention furthermore is prevention of collisions with others in traffic or with obstacles on or next to the road. As is known, there are frequently such collisions with ensuing damages if either the maximum braking effect is not being achieved or collision is inevitable on account of excessive relative speeds. Therefore, the present invention addresses the problem of obtaining the particular maximum braking efficiency as a function of varying traffic conditions during that time when travel still is normal, in order not to exceed the still admissible relative speed when approaching obstacles or curves, as regards collisions.

SUMMARY OF THE INVENTION

This problem is solved by a system of the kind initially mentioned, this system characterized in that, by means of known accessory measuring devices,
1. acceleration or deceleration and/or power or braking moments, and simultaneously
2. the occurring positive or negative slippage of at least one powered or braked moving member are measured and compared with one another as a function of time for a predetermined period, and the results obtained from this comparison are fed, possibly following intermediate storage, to a display system and/or are fed following comparison with other data regarding present driving conditions to a control and regulation apparatus for the purpose of acting on the braking or powering system.

In an advantageous variation of this system, the slippage of at least one powered or braked moving member is measured within the range of the powering or braking moments where it does not change as a comparison value, in order to obtain the shape change slippage independent of powering or braking, or, i.e., the apparent slippage. The process of the invention is suitably and appropriately carried out so that slippage is determined by non-contact measurement both of the tangential velocity of the moving members and the relative speed to the road surface by means of at least one optical correlator. In order to determine a maximum powering or braking effect, as a comparison value for the regulation apparatus, one may first use the measured characteristic corresponding to the minimum friction between road and moving member, whereupon one makes use of the just obtained characteristic corresponding to instantaneous friction. One may also determine the slippage by comparing the speed of moving members that are not being braked or powered with that of the braked or powered ones.

Equipment for the implementation of the system of the present invention is characterized by moment and rpm transmitters for the determination of the effective torque and wheel rpm between wheel and road, by a speed transmitter for measuring the actual vehicle speed with respect to ground, by a comparison logic with memory and display for the determination of maximum braking effectiveness and by a control system with braking control valves in order to act on the vehicle brakes when there is danger of collision. An optical image correlator used as speed transmitter and disclosed in U.S. Patent 3,956,401 and application Ser. No. 344,484 may consist of a light source, a condensor, the measurement object, reproducing optics, a grating with a plurality of prisms on its surface and two photoelectric detectors. Lastly, it is appropriate to provide a display system controlled by the electrical signals obtained in order to display the recommended maximum speed relating to the instantaneous road condition.

BRIEF DESCRIPTION OF THE DRAWINGS

The present invention is best described in further detail below by means of the following embodiments shown in schematic representation, wherein.

DESCRIPTION OF THE PREFERRED EMBODIMENTS

Figure 1:
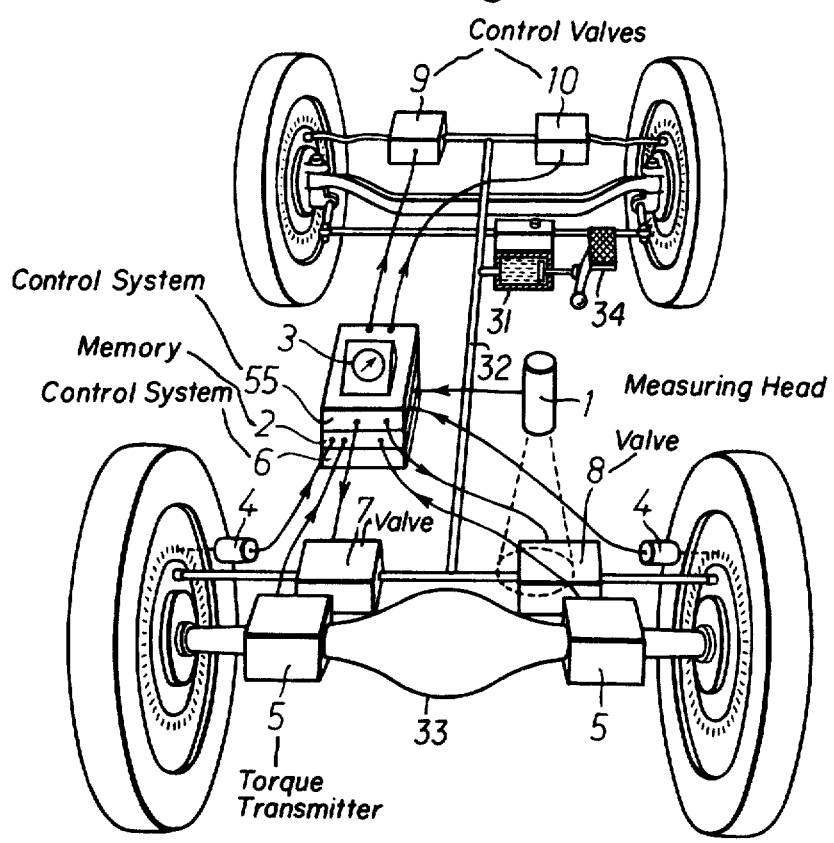
FIG. 1 shows a device for determining the maximum braking efficiency.

FIG. 1 shows a measuring head denoted by 1 and measuring the speed of a vehicle above and with respect to ground in no-contact manner. One may use an image correlator of the kind described in FIG. 2 of the present invention, or FIGS. 3, 4, 5, 9 or 10 of application Ser. No. 344,484. The electrical output signals from measuring head 1 are fed to a comparison logic with memory 2 and display device 3. Combined transmitters 4, 5 for measuring the rpm and the torque transferred from wheel to road are provided at the wheel axles and their output signals are also applied to comparison logic memory 2.

Comparison logic memory 2 is followed by control system 55 for acting on the vehicle brakes via control valves 7, 8, 9 and 10.

In FIG. 1, a downwardly oriented optical speed correlator system 1 is illustrated which measures, in a no-contact manner, the driving speed in the forward direction along the ground, independently of its distance to the ground. Respectively, one rotary speed transmitter 4 is arranged at the wheels of the vehicle illustrated in the figure. The output signals of these speed transmitters are fed, together with the output signals of the correlator system 1, to the imputs of a comparison stage 2. The latter, in turn, controls a servo system 55 disposed in the same housing and the servo system cooperates with four brake control valves 7–10 associated with the four braked wheels. These valves are inserted, in a conventional manner, in the brake line 32 of the hydraulic brake system which is joined to the master brake cylinder 31. The servo system 55 additionally cooperates with the differential gear 33 of the driving wheels.

The device described thus far has the following functions. When the braking pressure during the actuation of the brake 34 exceeds a predetermined threshold value, the brake servo system, via the brake control valves 7–10, varies the braking pressure of each wheel until the comparison stage 2 registers a preferably adjustable desired value of the slip between wheel and road, respectively as a difference of the output signals from the wheel transmitters 4 and the correlator system 1. Independently of this brake power control, the servo system applies, via the differential gear 33, the driving force to the slower driving wheel when a predetermined speed difference of the two driving wheels has been exceeded.

The function of the equipment described so far is as follows: as is known, the problem during braking is to obtain an equilibrium between the friction pairings of brake lining and brake drum on one hand and wheel and path on the other by limiting the exerted braking force so that the wheel slippage associated with the maximum transferred braking moment between wheel and path is not exceeded and that a sliding friction is maintained within the brake. This maximum braking torque $M_{max}$ is a function of two independent variables, the wheel loading $G$ and the friction coefficient $f$:

$$M_{max} = f(f, G)$$

$f$ depends empirically on the vehicle speed, the road condition and on the tire. Even for braking torques $M < M_{max}$, a wheel slippage (gliding speed) $s$ is present, which will increase to a critical value $s_{crit}$ for $M_{max}$.

Therefore, if that slippage is being measured which occurs for non-critical braking or powering torques $M$ in ordinary traffic, then this measurement yields the road dependent friction coefficient $f$ and thereby $M_{max}$ may be determined. This determination takes place in comparison logic 2 by means of the values of speed, torque and rpm obtained from pickups 4, 5. In order to obtain reliable values of $M_{max}$, the measurements are subjected to averaging and to determination of extreme values for a predetermined period. The maximum braking torque so obtained is then compared in turn with the vehicle speed. When the ratio of vehicle speed to $M_{max}$ assumes jeoparizing values, then the logic 2 acts on a control system 6 for braking and powering so as to cause a decrease in speed by means of braking control valves, 7, 8, 9 and 10, however in such a manner that the slippage thereby occurring does not exceed $s_{crit}$. In order to assess the speed safety limit, one may furthermore use still other information regarding the present traffic conditions. For instance, the driver may feed in via key (and the like) data regarding traffic density abundant road bends, road width, city traffic, turnpike traffic, legal speed limits, depth of vision due to darkness and weather conditions, etc.

As is known, the slippage of rubber-tired vehicles consists of gliding slippage $s_g$ and change-of-shape slippage $s_f$. Only gliding slippage being of interest as regards adhesion to ground, the change-of-shape slippage should be eliminated from the measurements. This is achieved by the invention in that the particular slippage value is determined which will remain constant in the range of small braking torques and which then may be subtracted from other slippage values $s$. One obtains thereby simultaneously the elimination of other effects spuriously affecting the measurement of slippage, for instance the varying radius of the wheels because of tire wear or of vehicle loading or of tire pressure, etc.

Figure 2:
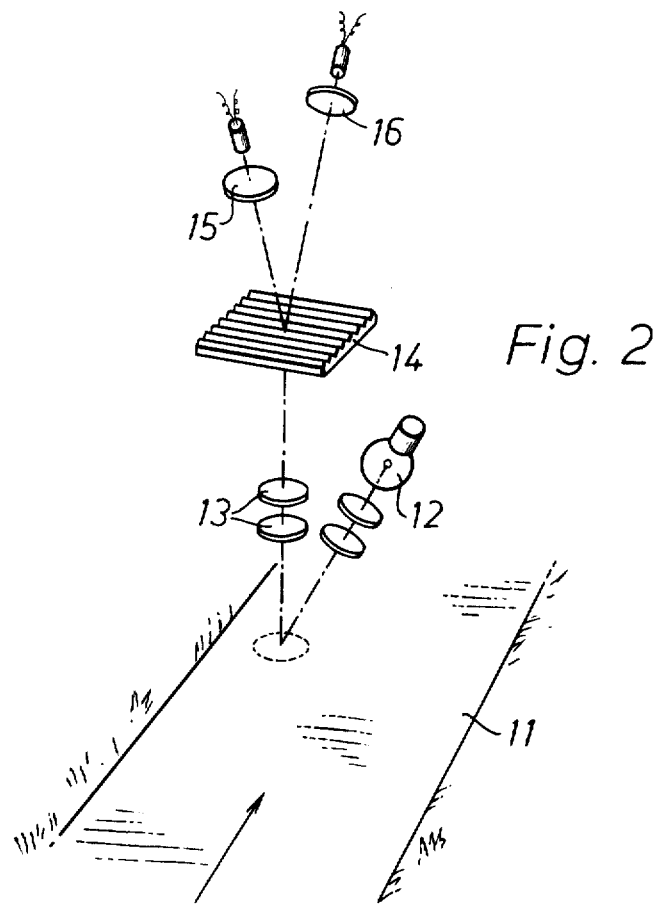
FIG. 2 is an embodiment of an optical image correlator useful in FIG. 1.

An image correlator known from applications Ser. Nos. 283,967; and U.S. Pat. No. 3,856,401; and Ser. No. 344,484, and shown in FIG. 2 is provided with a light source 12 for illuminating the object to be measured 11 (road). By means of optics 13, object 11 is reproduced on an optical grating 14. The light fluxes so generated are fed to photoelectric detectors 15 and 16. If the object to be measured moves in the direction of the arrow, then the output signals from detectors 15 and 16 show a frequency component proportional to the speed of motion.

The invention provides for replacing the measurement of braking torques for the determination of $M_{max}$ by a measurement of the changes in traveling speed connected with the braking (deceleration, acceleration). A powering torque is already present in normal travel from the motor, this torque may therefore be used for the slippage determination of the invention, provided this torque is high enough to cause gliding slippage. In this respect the braking and powering torques are equivalent.

Aside from the above-mentioned averaging of the friction coefficient $f$ between wheel and road, it is also appropriate to provide a display of the recommended maximum speed referred to the instantaneous road condition(s), for those cases when the extant coefficient of friction rapidly changes. A warning system is appropriate for the case of such changes becoming appreciable.

Figure 3:
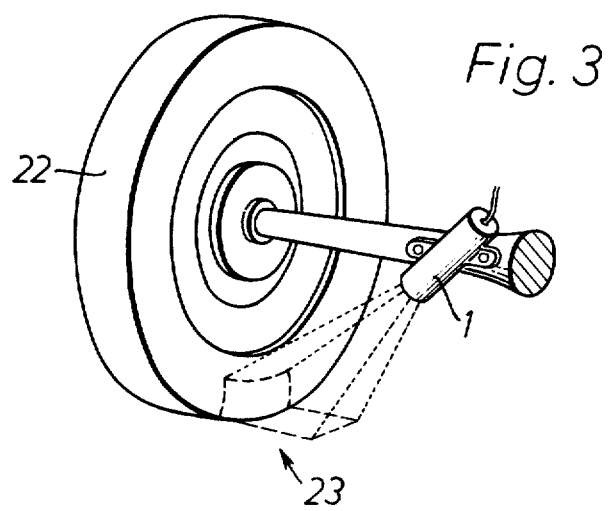
FIG. 3 is an embodiment of an apparatus for measuring slippage with the optical image correlator of FIG. 2.

A measuring head denoted by 1 in FIG. 3 simultaneously detects the relative speed of the ground and of a running member 22 in a common field of measurement 23. If these two speeds differ when slippage occurs, then the output signals from measuring head 1 comprise of different frequency components that are analyzed so as to determine road conditions in a manner already described.

Particular embodiments of apparatus for implementing the system of the present invention are characterized by torque and rotation indicators 4, 5 for determining the effective torque and wheel rpm between wheel and road, by a speed indicator 1 for measuring the actual vehicle speed with respect to ground, by a comparison logic with memory 2 and display 3 for determining the maximum braking effect, and by a control system 6 with braking control valves 7, 8, 9, 10 in order to act on the vehicle brakes when there is jeopardy of collision.

Another embodiment for implementing the system of the present invention is characterized by an optical image correlator acting as a speed transmitter 1 consisting of a light source 12, a condensor, the object being measured 11, reproducing optics 13, a grating with a plurality of prisms on its surface 14 and two photoelectric detectors 15, 16.

Still another embodiment is characterized in that a display system controlled by the electrical signals is provided for displaying the recommended maximum speed and/or a safety space with respect to the vehicle ahead in reference to the instantaneous road condition.

We claim:

1. A method for determining the maximum tractive and braking effect in a vehicle provided with rubber-tired elements controllable to provide tractive and braking effort in contact with a road surface, the method comprising the steps of:
   measuring previous to applied braking operation and during the normal travel of said vehicle and in consequence of said road surface any change in speed of said vehicle and any tractive and braking effort applied to said controllable elements within a predetermined time interval;
   measuring simultaneously within said time interval and generating magnitude signals and sign signals of any slippage of at least one of said controllable elements;
   comparing said signals received from said measurements to generate signals having characteristic values; and
   applying said signals having characteristic values to indicating means and to controlling means for displaying said maximum tractive and braking effect to be expected at full braking of said vehicle and for affecting the tractive and braking operation of said controllable elements respectively.

2. The method as claimed in claim 1, further comprising the step of storing temporarily said signals having characteristic values in an intermediate storage device before applying said values to said indicating means and to said controlling means.

3. The method as claimed in claim 1, further comprising the step of measuring slippage of at least one of said controllable elements, within a range of said tractive and braking efforts displaying unchanged slippage, for ascertaining apparent slippage and slippage resulting from deformation of said controllable elements both being independent of said tractive and braking effort.

4. The method as claimed in claim 1, wherein said slippage is determined by no-contact measurement both of the peripheral speed of said controllable elements and of the relative speed in respect to said road surface using at least one optical correlator.

5. The method as claimed in claim 1, wherein for generating the maximum tractive effort and braking effort respectively firstly the measured characteristic value corresponding to the minimum frictional coupling between said controllable elements and said road surface and thereafter the directly determined characteristic value corresponding to the instantaneous coupling is applied to said controlling means as a comparison value.

6. The method as claimed in claim 1, wherein said slippage is determined by comparing the speed of said controllable elements providing tractive effort and non-tractive effort respectively in contact with said road surface with the speed of said controllable elements providing braked effort and non-braked effort respectively.

7. An apparatus for determining the maximum tractive and braking effort at a vehicle provided with rubber-tired elements controllable to provide tractive and braking effort in contact with a road surface, the improvement comprising:
   torque and rotation indicators (4, 5) for measuring the effective torque and wheel rpm between wheel and road previous to any braking operation and during the normal travel of said vehicle and in consequence of the changing properties of said road surface;
   a speed indicator (1) for measuring the actual vehicle speed with respect to ground;
   a comparison logic with memory (2) and display (3) for determining the maximum braking effort in response to signals from said torque and rotation indicators and said speed indicator and indicating the maximum braking effect to be expected at full braking of said vehicle; and
   a control system (6) with braking control valves (7, 8, 9, 10) for acting on the vehicle brakes, when the measured values indicate an imminent collision.

8. The apparatus of claim 7, wherein said speed indicator is an optical image correlator comprising a light source (12), a condenser, the object being measured (11), reproducing optics (13), a grating (14) having a plurality of prisms on the surface and two photoelectric detectors.

9. A method for determining the maximum tractive and braking effect in a vehicle provided with rubber-tired elements controllable to provide braking effort in contact with a road surface, the method comprising the steps of:
   measuring previous to applied braking operation and during the normal travel of said vehicle and in consequence of said road surface any change in speed of said vehicle and braking effort applied to said controllable elements within a predetermined time interval;
   measuring simultaneously within said time interval and generating magnitude signals and sign signals of any slippage of at least one of said controllable elements;
   comparing said signals received from said measurements to generate signals having characteristic values; and applying said signals having characteristic values to indicating means and to controlling means for displaying said maximum braking effect to be expected at full braking of said vehicle and for affecting the braking operation of said controllable elements respectively.

10. The method as claimed in claim 9, further comprising the step of storing temporarily said signals having characteristic values in an intermediate storage device before applying said values to said indicating means and to said controlling means.

11. The method as claimed in claim 9, further comprising the step of measuring slippage of at least one of said controllable elements, within a range of said braking efforts displaying unchanged slippage, for ascertaining apparent slippage and slippage resulting from deformation of said controllable elements both being independent of said braking effort.

12. The method as claimed in claim 9, wherein said slippage is determined by no-contact measurement both of the peripheral speed of said controllable elements and of the relative speed in respect to said road surface using at least one optical correlator.

13. The method as claimed in claim 9, wherein for causing the maximum braking effect initially the measured characteristic value corresponding to the minimum frictional coupling between said controllable elements and said road surface and thereafter the directly determined characteristic value corresponding to the instantaneous coupling is applied to said controlling means as a comparison value.

14. An apparatus for determining the maximum braking effect at a vehicle provided with rubber-tired elements controllable to provide braking effort in contact with a road surface, the improvement comprising:

torque and rotation indicators (4, 5) for measuring the effective torque and wheel rpm between wheel and road previous to any braking operation and during the normal travel of said vehicle and in consequence of the changing properties of said road surface;

a speed indicator (1) for measuring the actual vehicle speed with respect to ground;

a comparison logic with memory (2) and display (3) for determining the maximum braking effort in response to signals from said torque and rotation indicators and said speed indicator and indicating the maximum braking effect to be expected at full braking of said vehicle; and a control system (6) with braking control valves (7, 8, 9, 10) for acting on the vehicle brakes, when the measured values indicate an imminent collision.

15. The apparatus of claim 14, wherein said speed indicator is an optical image correlator comprising a light source (12), a condenser, the object being measured (11), reproducing optics (13), a grating (14) having a plurality of prisms on the surface and two photoelectric detectors.

* * * * *